United States Patent
Allen

(10) Patent No.: US 9,758,394 B2
(45) Date of Patent: Sep. 12, 2017

(54) TREATMENT OF CONTAMINATED WATER FROM GAS WELLS

(75) Inventor: Stephen D. Allen, Eagle, ID (US)

(73) Assignee: WATER SOLUTIONS, INC., Sioux Falls, SD (US)

( * ) Notice: Subject to any disclaimer, the term of this patent is extended or adjusted under 35 U.S.C. 154(b) by 425 days.

(21) Appl. No.: 12/859,107

(22) Filed: Aug. 18, 2010

(65) Prior Publication Data

US 2011/0042320 A1    Feb. 24, 2011

Related U.S. Application Data

(60) Provisional application No. 61/234,922, filed on Aug. 18, 2009.

(51) Int. Cl.
| | |
|---|---|
| B01D 21/01 | (2006.01) |
| C02F 1/52 | (2006.01) |
| B01D 61/14 | (2006.01) |
| C02F 1/00 | (2006.01) |
| C02F 1/56 | (2006.01) |
| C02F 103/10 | (2006.01) |

(52) U.S. Cl.
CPC ............ *C02F 1/5236* (2013.01); *C02F 1/001* (2013.01); *C02F 1/56* (2013.01); *C02F 2103/10* (2013.01); *C02F 2209/06* (2013.01)

(58) Field of Classification Search
CPC .......... C02F 1/5236; C02F 1/001; C02F 1/56; C02F 2103/10; C02F 2209/06
USPC ...... 210/738, 702–736; 166/266, 267, 305.1, 166/308.1, 308.2, 308.3; 175/66, 206, 175/207
See application file for complete search history.

(56) References Cited

U.S. PATENT DOCUMENTS

| | | | | |
|---|---|---|---|---|
| 4,229,572 A | * | 10/1980 | Zweigle | 536/89 |
| 4,353,803 A | * | 10/1982 | Dover, Jr. | 210/728 |
| 4,800,039 A | * | 1/1989 | Hassick et al. | 252/181 |
| 5,093,008 A | * | 3/1992 | Clifford, III | 210/725 |
| 6,428,705 B1 | * | 8/2002 | Allen et al. | 210/638 |
| 7,201,856 B2 | * | 4/2007 | Souter et al. | 252/181 |
| 2002/0096472 A1 | * | 7/2002 | Smith et al. | 210/606 |
| 2007/0102359 A1 | * | 5/2007 | Lombardi et al. | 210/639 |
| 2007/0125714 A1 | * | 6/2007 | Reddy | 210/702 |

* cited by examiner

*Primary Examiner* — Claire Norris
*Assistant Examiner* — Nader Hossaini
(74) *Attorney, Agent, or Firm* — Kirton McConkie; Evan R. Witt

(57) ABSTRACT

Systems and methods for treating contaminated water from gas wells by adding an inorganic coagulant and a low molecular weight polymer to the contaminated water to increase the size of solid particulates in the water and to thereby allow the solid particulates to be filtered or to otherwise be removed from the water are disclosed herein. While the inorganic coagulant can be any suitable coagulant, in some cases the coagulant is selected from aluminum chlorohydrate, polyaluminum chloride, aluminum sulfate, and ferric sulfate. Similarly, the polymer can comprise any suitable polymer, such as epi/dma, a condensation product of epichlorohydrin and dimethyl amine. The described systems and methods can clean the contaminated water so that the water can then be treated in a variety of other manners, which may include reverse osmosis, deionization, treatment with mixed bed deionizers, electro-separation, fraction distillation, distillation, and other suitable water cleansing processes.

15 Claims, 4 Drawing Sheets

TREATMENT OF CONTAMINATED WATER FROM GAS WELLS

CROSS-REFERENCE TO RELATED APPLICATION

Figure 1:
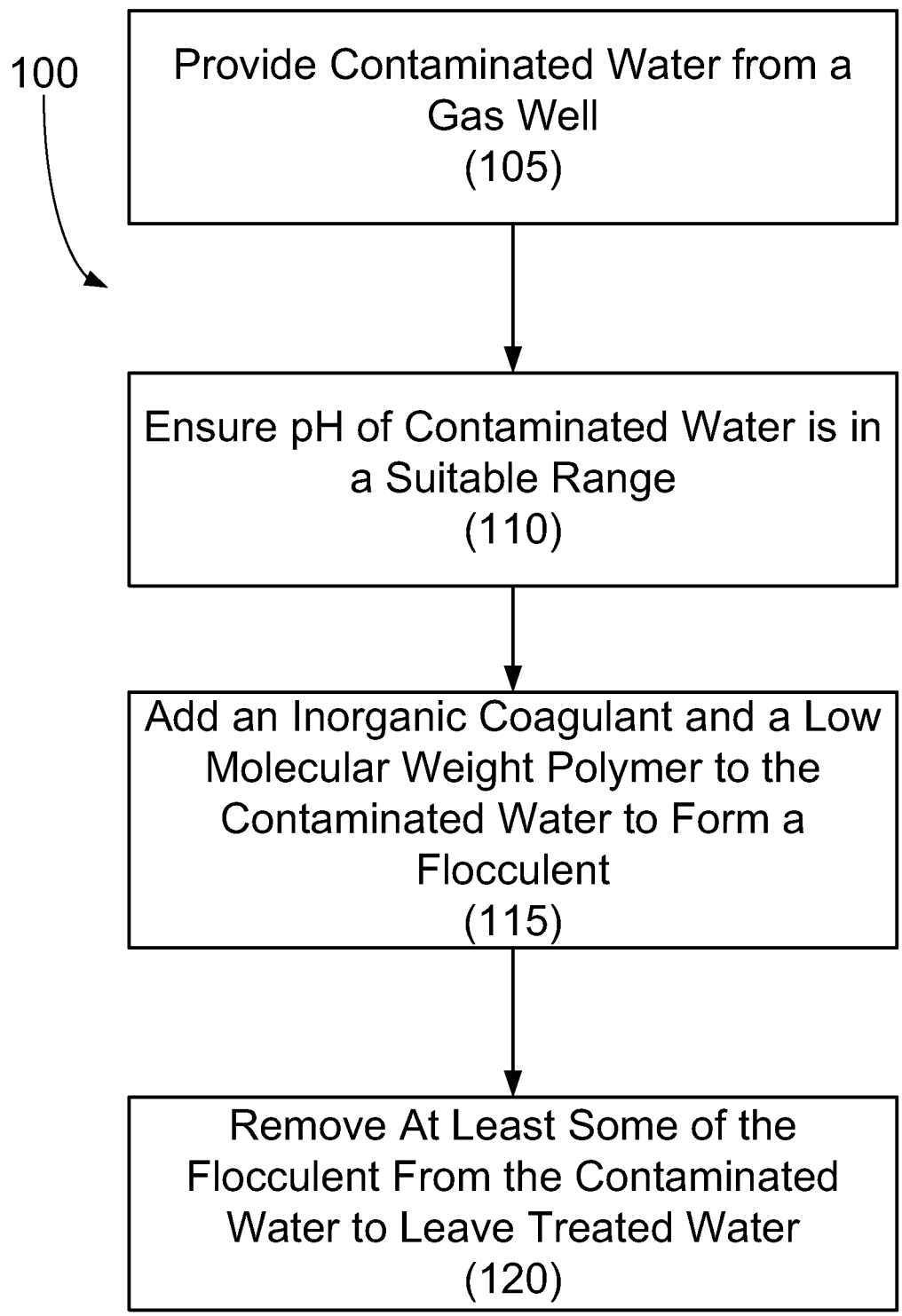

This application claims the benefit of U.S. Provisional Application No. 61/234,922, filed Aug. 18, 2009, entitled "Treatment of Contaminated Water from Gas Wells," the entire disclosure of which is hereby incorporated by reference.

FIELD OF THE INVENTION

The present invention relates to treating contaminated water from gas wells. More particularly, the present invention provides systems and methods for treating contaminated water from gas wells by adding an inorganic coagulant and a polymer, such as a low molecular weight organic polymer, to the contaminated water to increase the size of solid particulates in the water and to thereby allow the solid particulates to be filtered or otherwise removed from the water.

BACKGROUND OF THE INVENTION

Hydraulic fracturing or "frac'ing" is a common technique that is often used to increase the rate at which fluids, such as water, gas, and oil, can be extracted from an underground reservoir. In this technique, underground fractures are generally formed by pumping fracturing fluid, which often consists of water and sand, into a well bore at a rate that is sufficient to increase the pressure downhole to a value that is greater than the fracture gradient of the surrounding rock formation. This pressure then causes the formation to crack and, thereby, allows the fracturing fluid to enter in, and to extend the cracks further into, the formation. The cracks, in turn, can act as conduits between portions of the reservoir and the well bore.

Water from the fracturing fluid often exits a gas well in one of two forms; namely as flow back water or as frac'ed well water. In this regard, the term flow back water may refer to the initial charge of water that flows from the bore and the term frac'ed well water may refer to the longer term and more contaminated version of the flow back water. In some cases, the rough balance of the two contaminated water sources is approximately 1:4, wherein about 25% of the water that exits the well is flow back water and about 75% of the contaminated water is frac'ed well water.

The handling of contaminated water from gas wells has been a problem for years. Furthermore, the magnitude of this problem may be enormous. For instance, it is estimated that a single company, in a single location, can generate as much as 70,000 barrels of contaminated water from gas wells in a day. Assuming that a barrel equals 42 gallons, such a company could produce 2,940,000 gallons of contaminated water (e.g., 70,000 barrels/day×42) from one locale each day. Along these lines, some have estimated that the total volume of water consumed and taken from the natural gas wells in the United States alone is greater than about 10 billion gallons of water per year.

While the oil and gas exploration industry has been looking for a method and technology to treat contaminated water from gas wells and to be able to return the water for reuse in the wells, such contaminated water is currently often impounded or simply injected back into deep wells.

A significant advance in the treatment of this contaminated water would result in an enormous savings of the energy required to pick up, deliver, and haul the contaminated water from each well site—processes that are currently often accomplished by trucking all the water from locale to locale. In this regard, draught affected areas may be required to move the water several hundred miles to and from the site.

BRIEF SUMMARY OF THE INVENTION

The present invention relates to treating contaminated water from gas wells. More particularly, the present invention provides systems and methods for treating contaminated water from gas wells by adjusting the pH of the contaminated water to a suitable range, adding an inorganic coagulant and a polymer to the contaminated water to increase the size of solid particulates in the water and to form a flocculent (or coagulant), and by removing at least some of the flocculent from the contaminated water to leave a cleaner, treated water. In this manner, the described systems and methods can clarify or otherwise clean the contaminated water so that the treated water can be further cleaned through one or more of a variety of methods, including without limitation, by known or novel reverse osmosis techniques, deionization systems, mixed bed deionizers, electro-separation techniques, fractional distillation methods, distillation techniques, and other suitable water cleansing processes.

While the described systems and methods have proven particularly useful for treating contaminated water from gas wells, the skilled artisan will recognize that the described systems and methods may be modified to treat contaminated water from a variety of sources, including, but not limited to, industrial wastewater sources, sewage sources, water treatment plants, and any other suitable source.

These features and advantages of the present invention will become more fully apparent from the following description and appended claims, or may be learned by the practice of the invention as set forth hereinafter.

BRIEF DESCRIPTION OF THE SEVERAL DRAWINGS

Figure 2:
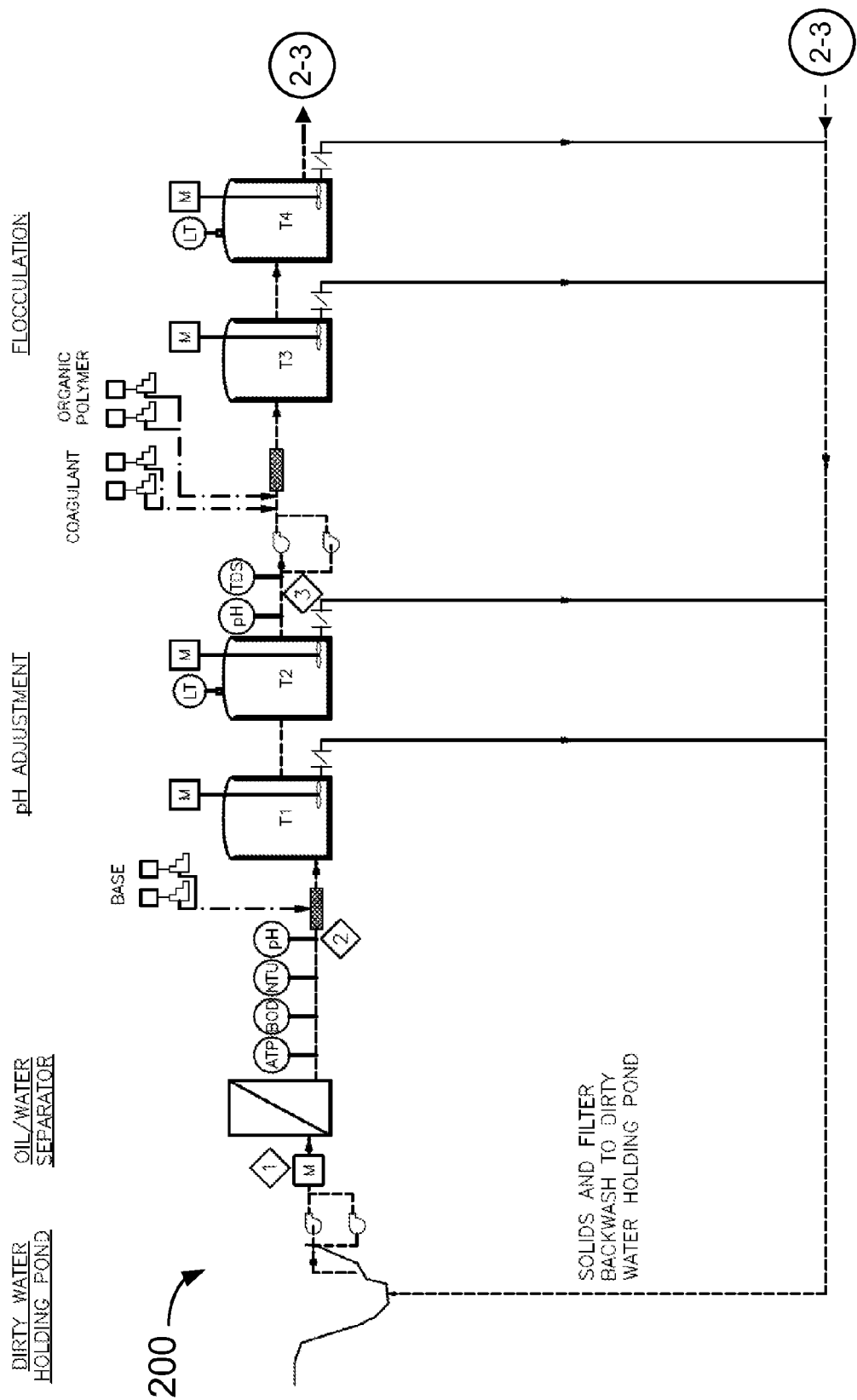
Figure 3:
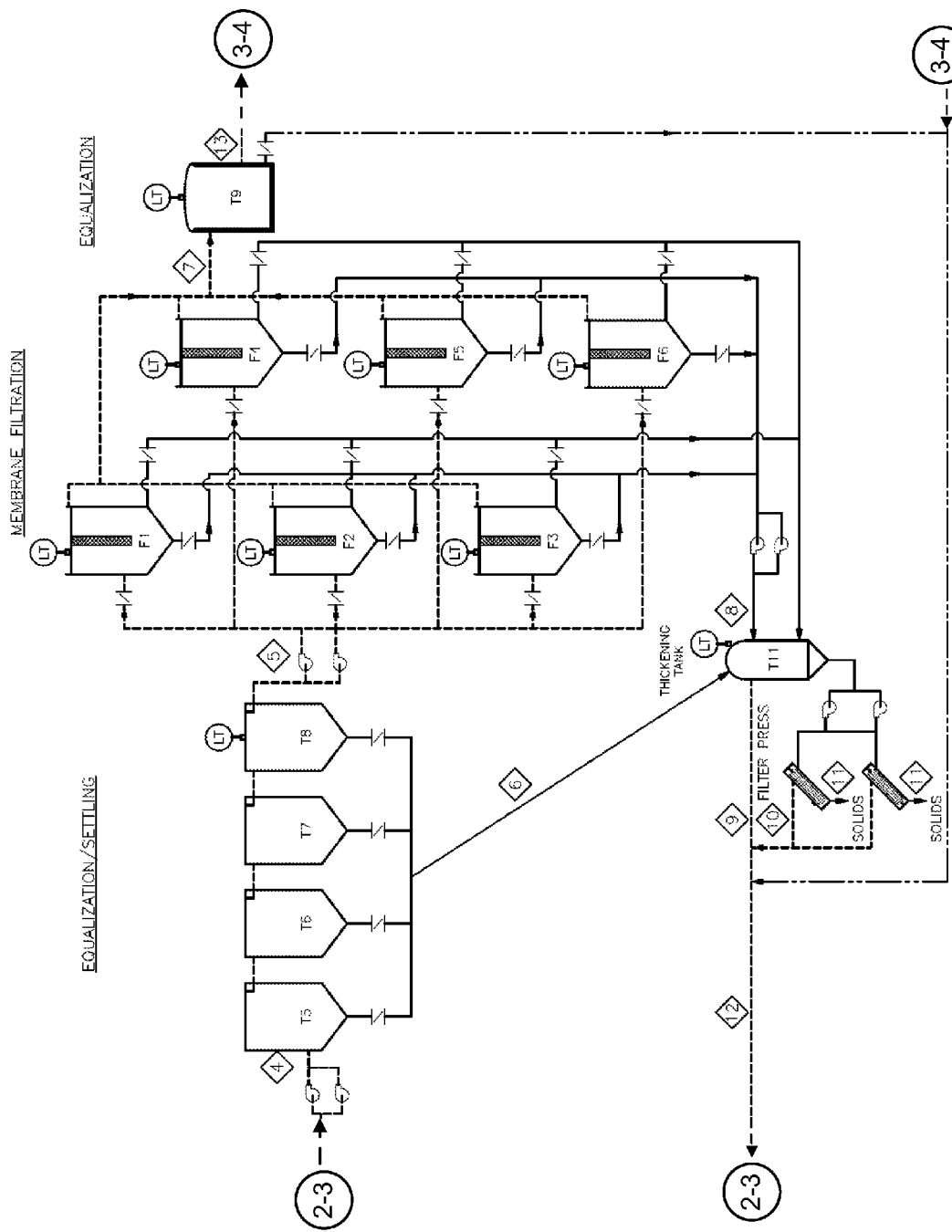
Figure 4:
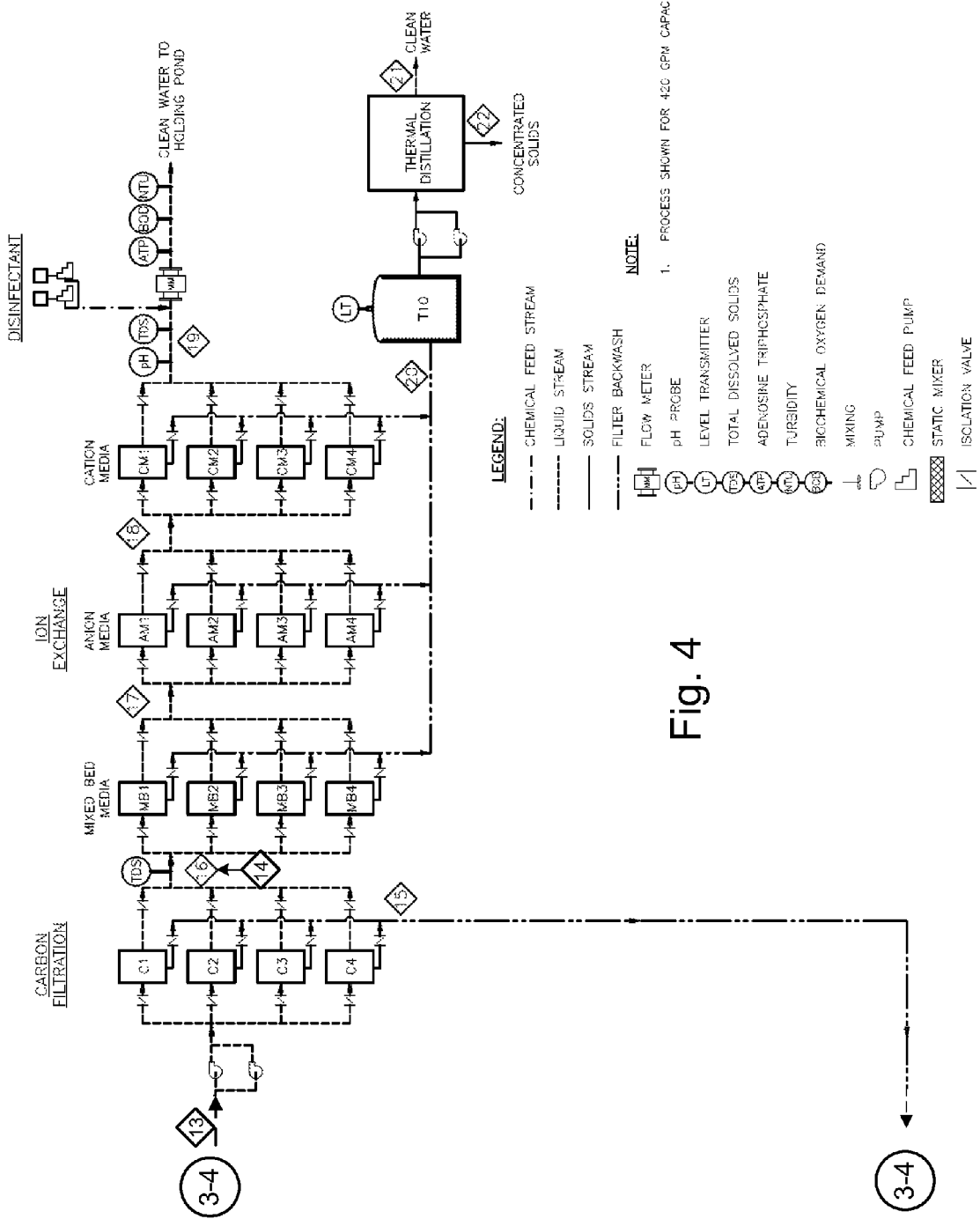

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

FIG. 1 depicts a flow chart of a representative embodiment of a method for treating contaminated water from a gas well; and FIGS. 2-4 depict different portions of a schematic diagram illustrating a representative system for treating the contaminated water.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable inorganic coagulants, polymers, chemical concentrations, filtration methods, etc., to provide a thorough understanding of embodiments of the invention. One having ordinary skill in the relevant art will recognize, however, that the invention may be practiced without one or more of the specific details, or with other methods, components, systems, materials, and so forth. In other instances, well-known structures, materials, or operations are not shown or described in detail to avoid obscuring aspects of the invention.

The present invention provides systems and methods for treating contaminated water from gas wells (i.e., flow back water and/or frac'ed well water) in such a manner that the treated water is cleaned enough that it can be further treated by any suitable known or novel water cleaning technique, such as reverse osmosis, deionization, treatment with mixed bed deionizers, electro-separation, fractional distillation, distillation, and/or any other suitable method.

While the described systems and methods can comprise any suitable step, process, procedure, or component, FIG. 1 shows a representative embodiment in which the method 100 for treating contaminated water from a gas well comprises: providing contaminated water from a gas well (as shown at step 105), adjusting the pH of the contaminated water (as shown at step 110), precipitating solids in the contaminated water by forming a flocculent (as shown at step 115), and removing at least some of the flocculent to leave treated water (as shown at step 120). To provide a better understanding of the described method, each of the aforementioned steps is described below in more detail.

To begin with, step 105 in FIG. 1 shows that the method 100 begins by providing contaminated water from a gas well. While this contaminated water can come from any suitable source, in some embodiments, such water comprises flow back water and/or frac'ed well water that exits the well.

With reference now to step 110, FIG. 1 shows the method 100 can include ensuring that the pH of the contaminated water is in a suitable range that allows a flocculent to form in the contaminated water when one or more suitable coagulants and polymers are added to the water (as discussed below with respect to step 115). In this regard, the contaminated water's pH can be maintained and/or adjusted to any suitable range that allows the flocculent to form. Indeed, in some embodiments, the contaminated water's pH can be adjusted so that it as low as a pH selected from about 4.5, about 6.9, and about 7.2. On other hand, in some embodiments, the contaminated water's pH can be adjusted to that it as high as a pH selected from about 7.7, about 8.1, and about 10. Indeed, in one example, the contaminated water's pH is adjusted and/or maintained to be between about 6.9 and about 8.1. In another example, however, the contaminated water's pH is adjusted to be between about 7.2 and about 7.7.

Where the contaminated water's pH is adjusted to a suitable range, the water's pH can be adjusted in any suitable manner, including without limitation, through the addition of one or more bases and/or acids. For instance, where the contaminated water's pH is below a desired range, calcium oxide, calcium hydroxide, magnesium oxide, magnesium hydroxide, and/or another suitable base can be added to the contaminated water to raise its pH. In this regard, in some embodiments, because calcium oxide tends to help certain metal cations precipitate from contaminated water, calcium oxide is used to raise the contaminated water's pH.

With reference now to step 115, FIG. 1 shows that the method 100 can include forming a flocculent in the contaminated water. In this manner, the method allows the size of contaminants and solid particulates in the contaminated water to be increased so that the contaminants and particulates can be easily removed from the contaminated water, thereby leaving treated water that is clearer and cleaner than the original contaminated water.

Where a flocculent is formed in the contaminated water, the flocculent can be formed in any suitable manner, including without limitation, through the addition of one or more inorganic coagulants and one or more polymers. With respect to the inorganic coagulant, the coagulant can comprise any suitable inorganic coagulant that forms a flocculent with contamination and particulates (e.g., sand, metals, proppant, dirt, ions, etc.) in the contaminated water when the coagulant and water are mixed with the polymer (discussed below) at a suitable pH. Some examples of suitable organic coagulants include, but are not limited to, aluminum chlorohydrate, polyaluminum chloride, aluminum sulfate, ferric sulfate, ferric chloride, selenium, dithiocarbamate, and dithiocarbonic acid. Indeed, in some embodiments, the inorganic coagulant comprises aluminum chlorohydrate.

Under one non-binding theory, it is currently believed that certain inorganic coagulants may be more effective at removing certain types of contaminants and particulates from contaminated well water. By way of non-binding example, while aluminum chlorohydrate may be well suited for forming a flocculent containing metals, nitrates, and phosphates, dithiocarbamate may be better suited for forming a flocculent containing metal cations that have a plus 2 or 3 charge (including without limitation, ions of copper, zinc, nickel, chrome, and/or cadmium) from contaminated water. Under this theory, the inorganic coagulant or coagulants that are used to treat contaminated water for a particular well can be specifically tailored for the contents of that water.

With respect now to the polymer, the polymer can comprise any suitable polymer that forms a flocculent with contaminants and particulates (e.g., sand, metals, proppant, dirt, ions, etc.) in the contaminated water when the polymer and contaminated water are mixed with the coagulant at a suitable pH. For instance, the polymer can comprise one or more low molecular weight and/or high molecular weight polymers. Some examples of suitable low molecular weight polymers include, but are not limited to epi/dma (which is a condensation product of epichlorohydrin and dimethyl amine, and which has a molecular weight of approximately 240,000 grams/mole), a diallyldimethylammonium chloride ("DADMAC") polymer, and a low molecular weight acrylamide polymer. Indeed, because some high molecular weight polymers form particles or flocculent that does not filter well, in some embodiments, the described method uses a low molecular weight polymer, such as epi/dma, to form the flocculent. Thus, the inorganic coagulant and the polymer added to the contaminated water are selected to increase the size of solid particulates in the water and to form a flocculent, and thereby allow the solid particulates and flocculent to be filtered or to otherwise be removed from the water.

Where the described methods use an inorganic coagulant and a polymer to form flocculent in contaminated water, the inorganic coagulant and the polymer can be added to the contaminated water so as to have any suitable concentration that allows contaminants and particulates in the water to be formed into flocculent particles that have a diameter that is generally less than a diameter selected from about 200 microns, about 150 microns, and about 100 microns, but still larger than a diameter selected from about 2 microns, about 12 microns, about 20 microns, and about 30 microns. Indeed, in some embodiments, the inorganic coagulant is added to the contaminated water until the coagulant has an initial concentration (e.g., a concentration present in the water before the flocculent is removed) between about 100 milligrams per liter ("mg/L") and about 600 mg/L. In other embodiments, the inorganic coagulant is added until the coagulant has an initial concentration between about 150 mg/L and about 600 mg/L in the contaminated water. In still other embodiments, the inorganic coagulant is added to the contaminated water until the coagulant has an initial concentration between about 275 mg/L and about 425 mg/L.

In some embodiments, the polymer (e.g., epi/dma) is added to the contaminated water until the polymer has an initial concentration between about 5 mg/L and about 300 mg/L. In other embodiments, the polymer is added until the polymer has an initial concentration between about 50 mg/L and about 200 mg/L in the contaminated water. In still other embodiments, the polymer is added to the contaminated water until the polymer has concentration in the contaminated water between about 5 mg/L and about 30 mg/L.

The coagulant and polymer can also be present in the contaminated water at any suitable ratio. Indeed, in some embodiments, the coagulant and the polymer are present in the contaminated water at a ratio selected from less than: about 14 parts coagulant for every 1 part polymer, about 12 parts coagulant for every 1 part polymer, about 10 parts coagulant for every 1 part polymer, about 8 parts coagulant for every 1 part polymer, and about 6 parts coagulant for every 1 part polymer. Indeed, in some embodiments, the initial ratio (e.g., the ratio present after the coagulant and polymer are added to the contaminated water but before the flocculent is removed from the water) of coagulant to polymer in the contaminated water is between about 12:1 and about 8:1.

Once the flocculent has been formed, step 120 in FIG. 1 shows that the method 100 can continue as at least a portion of the flocculent is removed from the contaminated water to leave a cleaner and clearer treated water. In this regard, the flocculent can be removed from the contaminated water in any suitable manner, including without limitation, through settling, microfiltration, fractional distillation techniques, thermal distillation techniques, and/or another suitable method.

In some embodiments, following flocculation of the contaminants and particulates in the contaminated water, flocculent (or solids formed in the contaminated water) can be settled and removed in any suitable manner. Furthermore, in such embodiments, the solids can be handled in any suitable manner, including without limitation, by being thickened and processed using a filter press or any other suitable known or novel solids processing technique.

Although in some embodiments, a settling technique may be sufficient to remove enough flocculent that the treated water could be successfully reused, recycled, and/or processed through a reverse osmosis system, a deionization system, and/or any other suitable water cleaning system, in other embodiments, the contaminated water is passed through a microfiltration filter to become treated water. In such embodiments, the contaminated water can be passed through the filter after or in place of the settling step.

Where the contaminated water is passed through a microfiltration filter, the filter can comprise any suitable characteristic and can be used in any suitable manner. Indeed, in one example, the microfiltration filter can comprise a pore size having an average diameter that is less than a diameter selected from about 16 microns, about 12 microns, about 10 microns, about 8 microns, about 2 microns, and about 1 micron. In another example, the filter can be made of any suitable material, including, but not limited to, polypropylene, a polysulfone, polyethylene, and/or polytetrafluoroethylene. In still another example, while the contaminated water can be passed through the filter at any suitable pressure, in some embodiments, the contaminated water is passed through the filter at a pressure selected from a pressure that is less than: about 25 pounds per square inch ("psi"), about 20 psi, about 15 psi, about 10 psi, and about 5 psi. In yet another example, the filter can be backwashed periodically to remove collected flocculent, which can then be processed in any suitable manner.

In addition to the aforementioned steps, the described methods can be modified in any suitable manner. For instance, the described methods can comprise any other suitable step, in any suitable order. By way of example, the described methods can optionally comprise an oil/water separation step, an equalization step, a deionization step, a reverse osmosis step, a fractional distillation step, a distillation step, a disinfecting step, and/or any other suitable step that helps clean the contaminated/treated water.

Indeed, in some embodiments, the described methods comprise an oil/water separation step. This step may serve several purposes, including, but not limited to, removing oil that could foul a membrane filter and recovering oil. Additionally, this step can be accomplished in any suitable manner. By way of example and not limitation, the oil/water separation step can be accomplished through a simple settling technique, with the aid of an American Petroleum Institute oily water separator, and/or through any other suitable method.

Where the method comprises an oil/water separation step, such step can occur at any suitable time during the process, including without limitation, before the addition of the polymer and the coagulant and/or after the addition of the coagulant and the polymer. In some embodiments, however, the oil/water separation step occurs before the coagulant and/or the polymer is added to the contaminated water.

Where the method comprises an oil/water separation step, this step can also remove any suitable amount of oil from the contaminated water. Indeed, in some embodiments, the oil/water separation step is configured to leave the total petroleum hydrocarbon ("TPH") content below a concentration selected from about 200 parts per million ("ppm"), about 150 ppm, about 100 ppm, about 50 ppm, and about 25 ppm.

In some embodiments, the described method also comprises an equalization step in which treated water (e.g., water from which at least a portion of the flocculent has been removed) is placed in an equalization tank or storage tank. In such embodiments, placing the treated water in an equalization or storage tank can serve any suitable purpose, including without limitation, allowing a system implementing the method to maintain appropriate process flows and to accommodate temporary shutdown of the system during back flushing of the filter and resin stripping of any ion exchange media (discussed below).

In some embodiments, the treated water is also passed through one or more carbon filters to further clean and purify the water.

Furthermore, in some embodiments, in place of or in addition to one or more of the aforementioned steps, the treated water is passed through a deionization process. For instance, the treated water can optionally be passed over one or more known or novel mixed media ion exchange beds and/or one or more commercially available anion exchange media and/or cation exchange media—depending on the ions remaining the treated water.

In still other embodiments, in place of or in addition to one or more of the aforementioned steps, the treated water is further cleaned through one or more reverse osmosis treatments, electro-separation techniques, fractional distillation methods, thermal distillation processes, and/or any other suitable methods.

To provide a better understanding of the described systems and methods, a representative embodiment of a system for treating contaminated water from a gas well is illustrated in FIGS. 2 through 4 and detailed by Tables 1 and 2 (as shown below). It should be noted that while FIGS. 2 through 4 and Tables 1 and 2 show that water passes through the system in a particular manner, in other embodiments of the described systems and methods, any suitable step, portion, and/or component of the systems and methods shown in FIGS. 2 through 4 and Tables 1 and 2 can be reordered, removed, added to, and/or modified in any suitable manner.

To begin with, FIG. 2 shows that at pipe identifier 1, contaminated water (or process influent) enters the system 200 from a holding pond or from some other suitable source. Next, pipe identifier 2 shows that oil can be removed from the contaminated water before the pH of the water is adjusted (as shown by pipe identifier 3 and the pH adjustment tanks T1 and T2). Next, FIG. 2 shows that coagulant and polymer are added to the contaminated water and then mixed in one or more flocculation tanks (e.g., flocculation tanks T3 and T4) to form a flocculation effluent (as shown at pipe identifier 4 in FIG. 3).

Continuing with the method 200, FIG. 3 shows that the after the flocculation effluent passes through one or more equalization/settling tanks (e.g., equalization/settling tanks T5 through T8), settled effluent passes at pipe identifier 5 to one or more membrane filters (e.g., micro-filter tanks F1 through F6), while settled sludge passes (as shown by pipe identifier 6) to one or more thickening tanks (e.g., thickening tank T11).

At this point, FIG. 3 shows that the treated water (or microfiltration effluent) passes, as shown by pipe identifier 7, to one or more filter equalization tanks (e.g., equalization tank T9). Furthermore, FIG. 3 shows that sludge collected at the microfiltration filters can be directed (as indicated by pipe identifier 8) to one or more thickening tanks (e.g., thickening tank T11). In this regard, FIG. 3, at pipe identifier 9, shows that decant from the sludge flows back to the holding pond. Similarly, FIG. 3, at pipe identifiers 10 and 11, show that filter press liquid and filter press solids, respectively, are passed through a solids handling liquid return (shown at pipe identifier 12).

Returning now to the treated water in the equalization tank (e.g., tank T9), FIGS. 3 and 4 show that, at pipe identifier 13, as the treated water exits the equalization tank, the treated water becomes a carbon filter influent, which passes through one or more carbon filters (e.g., carbon filters C1 through C4). FIG. 4 then shows that while carbon filter effluent (shown at pipe identifier 14) becomes mixed bed influent (as shown at pipe identifier 16), carbon filter backwash is sent (as shown at pipe identifier 15) back to the holding pond.

At pipe identifier 16, FIG. 4 shows that the treated water (or mixed bed influent) can then be passed through one or more mixed-bed media chambers (e.g., mixed-bed media chambers MB1 through MB 4).

Next, at pipe identifier 17, FIG. 4 shows the treated water (or anion media influent) can pass through one or more conventional anion media chambers (e.g., anion media chambers AM1 through AM4). Following treatment in an anion media chamber, FIG. 4, at pipe identifier 18, shows that the treated water (or cation media influent) can pass into one or more cation media chambers (e.g., cation media chambers CM1 through CM4).

At pipe identifier 19, FIG. 4 shows that the clean, treated water can be disinfected, discharged, and sent to a clean water holding tank.

Additionally, at pipe identifier 20, FIG. 4 shows that the treated water (or cation media effluent) can be placed in one or more equalization tanks (e.g., equalization tank T10), before being sent through a thermal distillation process. Following the thermal distillation process, FIG. 4 (at pipe identifiers 21 and 22, respectively) show that clean, treated water can be discharged, separate from any concentrated solids.

As described above, Table 1 identifies and describes a representative embodiment of various process streams shown in the schematic diagram of FIGS. 2 through 4.

TABLE 1

| PIPE IDENTIFIER | PROCESS | FLOW (gpm) | PIPE DIAMETER (IN) | Comment |
|---|---|---|---|---|
| 1 | PROCESS INFLUENT | 420 | 6 | FROM HOLDING POND |
| 2 | OIL SEPARATOR EFFLUENT | 420 | 6 | DE-OILED FEED WATER |
| 3 | pH ADJUSTED FEED | 420 | 6 | ADJUST pH to 7.4 |
| 4 | FLOCCULATION EFFLUENT | 420 | 6 | COAGULATION/FLOCCULATION STEP |
| 5 | SETTLED EFFLUENT | 420 | 6 | SETTLE OUT LARGE SOLIDS |
| 6 | SETTLED SLUDGE | 50 | 4 | INTERMITTENT FLOW |
| 7 | MF EFFLUENT | 420 | 6 | FILTERED FLOW TO EQUALIZATION |
| 8 | MF SLUDGE | 50 | 4 | INTERMITTENT FLOW |
| 9 | SLUGE DECANT | 20 | 4 | INTERMITTENT FLOW |
| 10 | FILTER PRESS LIQUID | 15 | 3 | INTERMITTENT FLOW |
| 11 | FILTER PRESS SOLIDS | 3.8 | 4 | INTERMITTENT FLOW |
| 12 | SOLIDS HANDLING LIQUID RETURN | 20-40 | 3 | INTERMITTENT FLOW |

TABLE 1-continued

| PIPE IDENTIFIER | PROCESS | FLOW (gpm) | PIPE DIAMETER (IN) | Comment |
|---|---|---|---|---|
| 13 | CARBON FILTER INFLUENT | 420 | 6 | TOTAL FLOW FROM MF |
| 14 | CARBON FILTER EFFLUENT | 420 | 6 | TOTAL FLOW FROM CARBON FILTERS |
| 15 | CARBON FILTER BACKWASH | 50 | 4 | INTERMITTENT FLOW |
| 16 | MIXED BED INFLUENT | 420 | 6 | TOTAL FLOW FROM CARBON FILTERS |
| 17 | ANION MEDIA INFLUENT | 386 | 6 | TOTAL FLOW FROM MIXED BED |
| 18 | CATION MEDIA INFLUENT | 356 | 6 | TOTAL FLOW FROM ANION BED |
| 19 | CLEAN WATER DISCHARGE | 327 | 6 | FINAL DISCHARGE FROM CATION BED |
| 20 | ION EXCHANGE REJECT | 93 | 4 | FLOW TO THERMAL DISTILLATION |
| 21 | CLEAN WATER DISCHARGE | 81 | 4 | CLEAN WATER FROM THERMAL DISTILLATION |
| 22 | CONCENTRATED SOLIDS | 12 | 4 | SOLIDS FROM THERMAL DISTILLATION |

As described above, Table 2 identifies and describes a representative embodiment of various process equipment and apparatus shown in the schematic diagram of FIGS. 2 through 4.

TABLE 2

| PROCESS IDENTIFIER | EQUIPMENT | CAPACITY OR SIZE (GALLONS) | COMMENT |
|---|---|---|---|
| T1 | pH ADJUSTMENT TANK | 5000 | 10 MINUTE DETENTION TIME |
| T2 | pH ADJUSTMENT TANK | 5000 | 10 MINUTE DETENTION TIME |
| T3 | FLOCCULATION TANK | 5000 | 10 MINUTE DETENTION TIME |
| T4 | FLOCCULATION TANK | 5000 | 10 MINUTE DETENTION TIME |
| T5 | EQUALIZATION/SETTLING | 5000 | 10 MINUTE DETENTION TIME |
| T6 | EQUALIZATION/SETTLING | 5000 | 10 MINUTE DETENTION TIME |
| T7 | EQUALIZATION/SETTLING | 5000 | 10 MINUTE DETENTION TIME |
| T8 | EQUALIZATION/SETTLING | 5000 | 10 MINUTE DETENTION TIME |
| T9 | FILTER EQUALIZATION | 5000 | 10 MINUTE DETENTION TIME |
| T10 | BACKWASH EQUALIZATION | 5000 | TO THERMAL DISTILLATION |
| T11 | THICKENING TANK | 5000 | THICKEN SOLIDS |
| F1 | MICRO-FILTER | 150 gpm | SUBMERGED FILTER IN TANK |
| F2 | MICRO-FILTER | 150 gpm | SUBMERGED FILTER IN TANK |
| F3 | MICRO-FILTER | 150 gpm | SUBMERGED FILTER IN TANK |
| F4 | MICRO-FILTER | 150 gpm | SUBMERGED FILTER IN TANK |
| F5 | MICRO-FILTER | 150 gpm | SUBMERGED FILTER IN TANK |
| F6 | MICRO-FILTER | 150 gpm | SUBMERGED FILTER IN TANK |
| C1 | CARBON-FILTER | 150 gpm | PRESSURE FILTER |
| C2 | CARBON-FILTER | 150 gpm | PRESSURE FILTER |
| C3 | CARBON-FILTER | 150 gpm | PRESSURE FILTER |
| C4 | CARBON-FILTER | 150 gpm | PRESSURE FILTER |
| MB1 | MIXED-BED MEDIA | 150 gpm | ION EXCHANGE |
| MB2 | MIXED-BED MEDIA | 150 gpm | ION EXCHANGE |
| MB3 | MIXED-BED MEDIA | 150 gpm | ION EXCHANGE |
| MB4 | MIXED-BED MEDIA | 150 gpm | ION EXCHANGE |
| AM1 | ANION MEDIA | 150 gpm | ION EXCHANGE |
| AM2 | ANION MEDIA | 150 gpm | ION EXCHANGE |
| AM3 | ANION MEDIA | 150 gpm | ION EXCHANGE |
| AM4 | ANION MEDIA | 150 gpm | ION EXCHANGE |
| CM1 | CATION MEDIA | 150 gpm | ION EXCHANGE |
| CM2 | CATION MEDIA | 150 gpm | ION EXCHANGE |
| CM3 | CATION MEDIA | 150 gpm | ION EXCHANGE |
| CM4 | CATION MEDIA | 150 gpm | ION EXCHANGE |

While Tables 1 and 2 describe a representative embodiment of some parameters (e.g., flow rate in gallons per minute ("gpm"), pipe diameter in inches, tank capacity in gallons, etc.) of the system 200 shown in FIGS. 2 through 4, the described system can have any suitable parameters. Along these lines, Table 3 shows a representative embodiment of a process flow mass balance for the various process flow streams shown in the schematic diagram of FIGS. 2 through 4. Again, however, the information in Table 3 is not limiting and could be modified in any suitable manner that allows the described systems and methods to function as intended.

TABLE 3

Process Flow Mass Balance

| | |
|---|---|
| Treatment Influent | 420.0 gpm |
| Return Flow | 0.0 gpm |
| Flow into T1 = | 420.0 gpm |
| Detention time | 10.0 minutes |
| Volume = | 4,200.0 gallon tank required |
| Flow into T2 = | 420.0 gpm |

TABLE 3-continued

Process Flow Mass Balance

| | | |
|---|---|---|
| Detention time | 10.0 | minutes |
| Volume = | 4,200.0 | gallon tank required |
| Flow into T3 = | 420.0 | gpm |
| Detention time | 10.0 | minutes |
| Volume = | 4,200.0 | gallon tank required |
| Flow into Filters = | 420.0 | gpm |
| Number of Filters = | 5.0 | |
| Flow per Filter = | 84.0 | gpm |
| Flow into T4 = | 420.0 | gpm |
| Detention time | 10.0 | minutes |
| Volume = | 4,200.0 | gallon tank required |
| Flow into Carbon Filters = | 420.0 | gpm |
| Number of Filters = | 3.0 | |
| Flow per Filter = | 140.0 | gpm |
| Flow into MB = | 420.0 | gpm |
| Recovery Rate = | 92.0 | percent |
| Permeate Flow = | 386.4 | gpm |
| Reject Flow = | 33.6 | gpm |
| Flow into AM = | 386.4 | gpm |
| Recovery Rate = | 92.0 | percent |
| Permeate Flow = | 355.5 | gpm |
| Reject Flow = | 30.9 | gpm |
| Flow into CM = | 355.5 | gpm |
| Recovery Rate = | 92.0 | percent |
| Permeate Flow = | 327.0 | gpm |
| Reject Flow = | 28.4 | gpm |
| Flow into Thermal Distill = | 93.0 | gpm |
| Clean Water Out of Distill = | 81.3 | gpm |
| Solids out of Distill = | 11.6 | gpm |
| Total Clean Water Out = | 408.4 | gpm |

The described systems and methods may have several beneficial characteristics. In one example, in certain embodiments, the described systems and methods can be accomplished chemically, without the use of mechanical water purification techniques.

In another example, the described systems and methods can treat a relatively large amount of water (e.g., 750 gallons per square foot of membrane, per day ("gfd") with a relatively low back pressure (e.g., less than about 20 psi).

In still another example, certain embodiments of the described systems and methods allow contaminated water from gas wells to be cleaned such that the treated water can then be further cleaned through a reverse osmosis procedure, a deionization procedure, a fractional distillation procedure, and/or any other suitable process. As a result, the treated water can easily be reused and recycled in fracturing fluid, potable water, and a variety of other uses.

In still another example, some embodiments of the described systems and methods involve monitoring one or more parts of the systems or methods as they are used. In this manner, the described systems and methods can provide feedback information that can be used to dynamically tailor the methods to the particular characteristics of the contaminated water. For instance, in some embodiments in which the system determines that characteristics of the contaminated water are changing as the method progresses, the system can dynamically change the coagulant, polymer, and/or filter to best suit the contaminated water's newly discovered characteristics.

In yet another example, in some embodiments, the flocculent is non-viscous, non-tacky, non-deforming substance under the normal pressures expected during filtration (e.g., at pressures less than about 20 psi). As a result, the flocculent is easily filtered and can easily be flushed from the filter to prevent the filter from clogging.

The following examples and experimental results are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES

Example 1

In one example of a method for treating contaminated water from a gas well, pilot scale tests were performed using actual contaminated water from gas production wells. The doses and pHs were adjusted during the pilot scale run to determine the effectiveness of the treatment scheme in particle/flocculent formation of the contaminants and particulates from the contaminated influent water. The pH testing was from pH 6.5 to 9.0, with little visual differences seen in the quality or the amount of the precipitate solids generated from the reactions. The coagulant doses ran from 25 ppm of the aluminum chlorohydrate ("ACH") to as high as 250 ppm. The low molecular weight polymer doses ran from 5 ppm of the epi/dma to as high as 30 ppm of the epi/dma. No discernable visual differences were seen from doses as high as 250 ppm of the ACH. The data showed another story, however, in that the amount of suspended solids varied quite a bit, a measure of the amount of salt or total dissolved solids ("TDS" or contaminant) remaining in solution post treatment.

Intermediate samples were taken to determine the effectiveness of the treatment on the influent contaminated solution and although the total suspended solids ("TSS") values were reduced substantially, from 1,780 mg/L of TSS to 111 mg/L of TSS, it was decided that the post treated material should be put through a 10 micron microfiltration system employing low pressure microfiltration with polypropylene membranes of nominal 10 micron and 12 micron absolute. This was to effectively remove any contaminates present in the solution over 10 microns in size. Pressure was monitored as the primary determination in membrane fouling, and after 1,500 gallons of water had passed through 12 membranes of 3 feet in length, no discernable clogging of the membranes was seen. In this process, the water pressure at the membrane started at or near zero and stayed below 5 psi during the entire run. The analysis on flow and membrane function showed that the gallons per square foot of membrane per day or the ("gfd") was above 750 gallons per square foot of membrane per day.

While the chemistry (e.g., the addition of the coagulant and polymer) is sufficient to clean the contaminated water without using the microfilter, the microfilter was used to clean the post treated effluent water even further before discharge or before passing the treated water through a carbon filter. That is, with sufficient retention times, the chemistry, alone, of the described methods would be sufficient to clean the contaminants and particulates from the water influent stream, although still requiring the carbon filtration step for a final clean up prior to mechanical treatment by reverse osmosis or deionization. However, the demonstration conclusively shows that the system could be run without the use/benefit of the membranes. Nonetheless, microfiltration membranes were employed as a physical barrier to the passage of particles/flocculent from the reacted contaminated solution. The further treatment of the effluent from the microfiltration system, however, may require the microfilter and the carbon filtration step.

The data was generated from 2 sources of contaminated water. In this regard, the first source of contaminated water was a truckload of flow back water. As discussed earlier, the term flow back water includes the cleanest of the contaminated water, and it is the first water to be injected into the well. The data from the raw well effluent showed this to be the case.

With respect to the flow back water, a TDS analysis yielded the following results: 19,700 mg/L and 22,600 mg/L total solids.

In some cases, chlorides are the monitored entity for determining the quality of the water, that is, when to pull the water from the well. In this regard, the chlorides in the flow back water were: 10,600 mg/L.

The second source of contaminated water was from an impounded location, where the water had been taken from a well but had not been deep well injected, or was for other reasons, uninjectable. In this regard, it is believed that this second source of water had possibly been impounded for what approximately 1.5 years. This was second source of water was designated as DOTY-2H.

By comparison, the data demonstrates the extent of the contamination of the DOTY-2H sample when compared to the flow back sample. The TDS and TS of the DOTY-2H are as follow:

DOTY-2H: TDS=130,100 mg/L and the TS=150,900 mg/L.

In contrast, the TDS and TS of the flow back water are as follow:

Flow back: TDS=19,700 mg/L and the TS=22,600 mg/L

Under a non-binding theory, the average for the flow back water and for the highly contaminated water impounded water from a gas well is often around 25% flow back and around 75% highly contaminated water. Accordingly, our experiments used approximately 25% flow back and approximately 75% highly contaminated water. In this regard, we received 3,000 gallons of the flow back from which we processed approximately 1,500 gallons of water giving rise to our data on flow back water treatment. To the remaining 1,500 gallons of flow back water, we added approximately 4,500 gallons of the sample designated DOTY-2H, for a total of 6,000 gallons, wherein 1,500 (25%) represented flow back water and 4,500 (75%) represented the highly contaminated water fraction.

The mixed sample of flow back and highly contaminated water was then processed to perform near to the dilutions expected to be seen in the gas fields from which the water was obtained. However, under current operating parameters, water is not isolated as flow back or as being highly contaminated. Instead, it is believed that both types of water typically all go to the same place.

Testing continued for several days and several thousand gallons of contaminated water. The water's pH was monitored on site continuously and the volumes were also monitored on site. The following analytical is for the flow back testing done in the field. The Table 4 data shows the influent and the effluent composite testing from the work done in the first site directly on the well water described above. The composite samples were randomly pulled in 100 milliliter ("ml") retention grabs from the post carbon phase of the process. These samples were then blended together and retained at approximately 4° C. for the duration of the testing. Each sample represents one full operational day (approximately 10 hours) and over 2 days of sampling. The laboratory tests in a laboratory were confirmed by quick reference testing at the site and no changes were made during the 2 days of running the influent flow back water.

TABLE 4

Influent and Effluent from Treatment of Flow Back Water (all data in mg/L)

| | flow back influent | Treated Wastewater post treatment effluent | Treated Wastewater post treatment effluent |
|---|---|---|---|
| Cations | | | |
| Aluminum (Al) | 0.370 | 0.250 | 0.290 |
| Antimony (Sb) | <0.10 | <0.10 | <0.10 |
| Arsenic (As) | <0.10 | <0.10 | <0.10 |
| Barium (Ba) | 10.90 | 1.20 | 1.18 |
| Beryllium (Be) | <0.005 | <0.005 | <0.005 |
| Boron (B) | 16.900 | 2.240 | 2.230 |
| Cadmium (Cd) | 0.014 | 0.009 | 0.009 |
| Calcium (Ca) | 903.0 | 122.0 | 122.0 |
| Chromium (Cr) | 0.090 | <0.050 | <0.050 |
| Cobalt (Co) | 0.028 | 0.011 | 0.026 |
| Copper (Cu) | <0.010 | 0.030 | 0.030 |
| Iron (Fe) | 27.20 | 0.290 | 0.030 |
| Lead (Pb) | 0.070 | <0.050 | <0.050 |
| Magnesium (Mg) | 133.0 | 32.1 | 33.3 |
| Manganese (Mn) | 1.320 | 0.140 | 0.140 |
| Molybdenum Mo) | <0.050 | <0.050 | <0.050 |
| Nickel (Ni) | 0.111 | 0.070 | 0.090 |
| Potassium (K) | 157.0 | 22.5 | 22.9 |
| Selenium (Se) | <0.100 | <0.100 | <0.100 |
| Silicon (Si) | 31.7 | 7.96 | 7.42 |
| Sodium (Na) | 5,830.0 | 844.0 | 838.0 |
| Thallium (Tl) | <0.100 | <0.100 | <0.100 |
| Titanium (Ti) | <0.100 | <0.100 | <0.100 |
| Vanadium (V) | <0.050 | <0.050 | <0.050 |
| Zinc (Zn) | 0.390 | 0.110 | 0.141 |
| Anions | | | |
| Nitrate ($NO_3$) | <0.20 | 1.9 mg/L | 1.4 mg/L |
| Sulfate ($SO_4$) | 141 mg/L | 477 mg/L | 458 mg/L |
| Chloride (Cl) | 10,600 mg/L | 1,560 mg/L | 1,560 mg/L |

TABLE 4-continued

Influent and Effluent from Treatment of Flow Back Water (all data in mg/L)

| Analytical | flow back influent | Treated Wastewater post treatment effluent | Treated Wastewater post treatment effluent |
|---|---|---|---|
| Chemical Oxygen Demand (COD) | 3,120 mg/L | 468 mg/L | 459 mg/L |
| Biological Oxygen Demand (BOD) | 1,300 mg/L | 6 mg/L | 9 mg/L |
| Alkalinity (as $CaCO_3$) | 634 mg/L | 117 mg/L | 141 mg/L |
| Total solids (TS) | 22,600 mg/L | 3,770 mg/L | 3,780 mg/L |
| Total suspended solids (TSS) | 140 mg/L | 4 mg/L | 12 mg/L |
| Total dissolved solids (TDS) | 19,700 mg/L | 3,200 mg/L | 3,110 mg/L |
| pH | 7.02 | 7.4 | 7.5 |

Preliminary tests on the TDS, pH, and alkalinity for the DOTY-2H samples indicated that the sample was highly contaminated, especially with extremely high TDS values measured. The sample's pH was between about 5.95 and about 6.05—further indicating a relatively high concentration of anions, wherein it is generally understood that majority of the anions present are chlorides. Several laboratory scale tests were done on site to determine the efficacy of the approach and then the processing of the combined solution was placed on the pilot unit at several gpm (2-4 gpm). Processing the combined solutions was over 3 days with various iterations of the chemistry, membrane flux tests (mainly conducted at the end for optimum flow, but of the nineteen 19 membranes in the pilot unit, 12 were held back for testing and 7 were used in the beginning and as they were tested, each was blocked off using plugs to prevent flow), and stoichiometric tests were conducted to determine potential effects on the reactions and on the results from the changes.

The samples marked treated #'s 1, 2 and 3, were different samples based on the stoichiometric variations of the inorganic polymer and the organic (polymer ratios). In this regard, sample #1 was held at the laboratory analysis to have a ratio of 10:1 inorganic to organic polymer. Sample #2 was raised to a ratio of 14:1, a number based on previous experience to be the "edge" of performance, to determine the effects of the ratio on the performance. Finally, sample #3 was taken to have a ration of 7.5:1 inorganic to organic polymer to determine whether or not this ratio would substantially outperform the 10:1 ratio previously determined in the laboratory testing versus field testing.

The Table 5 data shows the influent and the effluent composite testing from the work done in the field directly on the composite blend of 25% flow back and 75% DOTY-2H well water described above. The test results from the composite of the 2 mixed sources (namely the flow back and the DOTY-2H) shows a similar treatment performance to just the flow back. The process does not change significantly from the flow back, other than the starting pH of the DOTY-2H was lower, pH=6.1 versus the flow back at pH=7.02. The concentration of the salts present was also noted in the field testing based on the TDS meter from our laboratory. Dilution of the samples in the field showed the average testing for the flow back at 22,000 mg/L of TDS, extremely close to the analytically derived 22,600 mg/L. The field testing on the DOTY-2H and the mixed sample of the flow back and the DOTY-2H, showed DOTY-2H=126,000 and the mixture at 100,700 versus the actual analytically derived data of DOTY-2H=130,100 (vs. 126,000) and the mixture=103,500 (vs. 100,700).

TABLE 5

Influent and Effluent from Treatment of the Blend of DOTY-2H and Flow Back Water

| | Influent | Sample (#1) | Sample (#2) | Sample (#3) |
|---|---|---|---|---|
| Cations | | | | |
| Aluminum (Al) | 7.91 | 4.51 | 2.44 | 1.64 |
| Antimony (Sb) | <0.1 | <0.1 | <0.1 | <0.1 |
| Arsenic (As) | 0.410 | 0.130 | 0.140 | 0.014 |
| Barium (Ba) | 338.0 | 19.8 | 59.4 | 21.1 |
| Beryllium (Be) | <0.005 | <0.005 | <0.005 | <0.005 |
| Boron (B) | 45.10 | 19.9 | 23.1 | 10.5 |
| Cadmium (Cd) | 0.110 | 0.011 | 0.006 | <0.005 |
| Calcium (Ca) | 8,940.0 | 1,980.0 | 2,960.0 | 2,070.0 |
| Chromium (Cr) | 0.120 | <0.050 | <0.050 | <0.050 |
| Cobalt (Co) | <0.020 | <0.020 | <0.020 | <0.020 |
| Copper (Cu) | 1.190 | 0.040 | 0.060 | 0.050 |
| Iron (Fe) | 172.0 | 5.10 | 2.72 | 1.98 |
| Lead (Pb) | 0.210 | 0.070 | 0.090 | 0.060 |
| Magnesium (Mg) | 1,050.0 | 383.0 | 523.0 | 406.0 |
| Manganese (Mn) | 4.460 | 1.080 | 1.380 | 1.130 |
| Molybdenum (Mo) | 0.080 | 0.050 | 0.120 | 0.120 |
| Nickel (Ni) | 0.180 | 0.130 | 0.130 | 0.150 |
| Potassium (K) | 730.0 | 209.0 | 299.0 | 216.0 |
| Selenium (Se) | 0.320 | <0.100 | <0.100 | <0.100 |
| Silicon (Si) | 31.0 | 22.5 | 21.0 | 24.10 |
| Sodium (Na) | 36,800.0 | 11,100.0 | 16,800.0 | 12,600.0 |

TABLE 5-continued

Influent and Effluent from Treatment of
the Blend of DOTY-2H and Flow Back Water

|  | Influent | Sample (#1) | Sample (#2) | Sample (#3) |
|---|---|---|---|---|
| Thallium (Tl) | <0.100 | <0.100 | <0.100 | 0.130 |
| Titanium (Ti) | <0.100 | <0.100 | <0.100 | <0.100 |
| Vanadium (V) | <0.050 | <0.050 | <0.050 | <0.050 |
| Zinc (Zn) | 0.410 | 0.110 | 0.260 | 0.107 |
| ANIONS | | | | |
| Nitrate ($NO_3$) | <0.200 | <0.200 | <0.200 | <0.200 |
| Chloride (Cl) | 86,800.0 | 22,000.0 | 31,300.0 | 23,100.0 |
| Sulfate ($SO_4$) | 75.0 | 163.0 | 150.0 | 195.0 |
| Analytical | | | | |
| Chemical Oxygen Demand | 4,890.0 | 4,550.0 | 2,770.0 | 2,480.0 |
| Biological Oxygen Demand | 780.0 | 59.0 | 47.0 | 61.0 |
| Alkalinity | 116.0 | 299.0 | 199.0 | 258.0 |
| Total solids (TS) | 150,900.0 | 45,400.0 | 63,600.0 | 44,400.0 |
| Total Suspended Solids | 1,780.0 | 46.0 | 49.0 | 111.0 |
| Total Dissolved Solids | 130,100.0 | 36,000.0 | 49,900.0 | 39,100.0 |
| Total petroleum hydrocarbon* | | | | |
| Diesel | 27.0 | | | <0.50 |
| Gasoline | <0.40 | | | <0.40 |
| Oil | 0.56 | | | <0.50 |
| pH | 6.08 | 7.40 | 7.48 | 7.55 |

*samples collected in glass, stored cold 4° C.
Blended sample of flow back and DOTY-2H (25%:75%)
All values reported in milligrams per liter (mg/L)

The differences noted above in the data analysis are from differing dosage parameters (primarily) and pHs, as is noted below. Interestingly (and counter-intuitively), the analysis showed that calcium oxide (Ca(O)) was the pH adjustment chemical of choice. The magnesium oxide (Mg(O)) was also employed in these reactions and although the data does not reflect it, none of the magnesium reactions were chosen for the testing or for final analysis of the effluent from the system. The visual reactions were not as clear but remained slightly turbid, and this phenomenon was noted with magnesium as the testing progressed and further attempts to incorporate the Mg(O) met with similar results. While it is theorized that Mg(O) can be used, it is also somewhat puzzling that the reaction leaves the solutions turbid, when theoretically, Ca(O) and Mg(O) should react the same. One point is that the Mg(O) is slower reacting than the Ca(O) and the influent was warm, above 30° C. Apparently, these two conditions have some effect on the solutions clarity.

The membranes were observed but not analytically tested at this stage of the pilot tests. The performance was monitored throughout the testing for clogging, lack of flow, and backwashing ease. Pressure was also monitored as a primary indicator of the clogging of the membranes and at no time did the pressure rise above 10 psi.

As is evident, the mixture of the 2 contaminated water sources at the percentages shown (75% DOTY-2H and 25% of the flow back, the estimated relative ratios of the water flows), still leaves a substantially difficult water to reverse osmosis (R/O). The decision was made to treat this resulting solution by employing a mixed bed ion exchange resin (e.g., by using both anionic and cationic exchange resins). Although both technologies are viable, the testing was carried out with Res-Kem, ion exchange resin, lot# rsthrmb115bg, and Thermax MB-115BG, mixed bed ion exchange resin. The results are as follows:

TABLE 6

Treated Wastewater

|  | Influent values | Post deionization values |
|---|---|---|
| Cations | | |
| Aluminum (Al) | 7.91 | 2.60 |
| Antimony (Sb) | <0.1 | <0.10 |
| Arsenic (As) | 0.410 | <0.10 |
| Barium (Ba) | 338.0 | 2.170 |
| Beryllium (Be) | <0.5 | <0.005 |
| Boron (B) | 45.10 | 1.88 |
| Cadmium (Cd) | 0.11 | 0.019 |
| Calcium (Ca) | 8,940.0 | 11.10 |
| Chromium (Cr) | 0.12 | <0.050 |
| Cobalt (Co) | <0.02 | <0.020 |
| Copper (Cu) | 1.19 | 0.230 |
| Iron (Fe) | 172.0 | 4.56 |
| Lead (Pb) | 0.21 | 0.170 |
| Magnesium (Mg) | 1,050.0 | 2.090 |

TABLE 6-continued

Treated Wastewater

|  | Influent values | Post deionization values |
|---|---|---|
| Manganese (Mn) | 4.46 | 0.770 |
| Molybdenum (Mo) | 0.080 | <0.050 |
| Nickel (Ni) | 0.18 | 0.030 |
| Potassium (K) | 730.0 | 2.20 |
| Selenium (Se) | 0.37 | <0.10 |
| Silicon (Si) | 31.0 | 8.46 |
| Sodium (Na) | 36,800.0 | 156.0 |
| Thallium (Tl) | 0.14 | 0.120 |
| Titanium (Ti) | <0.1 | <0.100 |
| Vanadium (V) | <0.050 | <0.050 |
| Zinc (Zn) | 0.41 | 0.126 |
| Anions |  |  |
| Nitrate ($NO_3$) | <0.2 | 0.5 |
| Chloride (Cl) | 86,800 | 1,020 |
| Sulfate ($SO_4$) | 75 | 17 |
| Phosphate ($PO_4$) | unknown | 2.57 |
| Analytical |  |  |
| Chemical oxygen demand (COD) | 4,890 | 149 |
| Biological oxygen demand (BOD) | 780 | <10 |
| Alkalinity | 116 | 0.0 |
| Total solids (TS) | 150,900 | 1,520 |
| Total suspended solids (TSS) | 1,780 | 3.0 |
| Total dissolved solids (TDS) | 130,100 | 584 |
| pH | 7.4 | 6.73 | all values in milligrams per liter, mg/L

As is evident from the data, the process works extremely well, and is quite reproducible. The effects of the first testing and the values shown from the treatment of the DOTY-2H well is quite representative of the reductions which were expected to be seen during the test work. Since the testing was carried out on a pilot scale system for the reaction, the microfiltration and the carbon, it is reasonable from that to expect similar reactions, filtration, and post carbon values from the system described herein.

The "final" effluent still contains some chloride and some additional cations, which could need removal to even lower levels. Under such circumstances, a mixed bed may be inadvisable for that process and instead would opt for a cationic and anionic exchange resin, specific to the type, anionic for chloride for example, or sodium as the cation. This would permit the process to lower contaminants to the levels for any type of reuse or recycle of the water as a downhole addition. Accordingly, the flow chart in FIGS. 2 through 4 shows that the process proceeds with a mixed bed ion exchange, followed by a specific ion exchange (cationic or anionic), to produce the final product.

Turning now from the examples discussed above, an additional feature of the described systems would be the solids from the microfilter and the solid waste isolated from the membrane cleaning and solids (backwashing) sloughing system inherent in the operations of the microfilter. The other significant volume of waste would be from the back washing and cleaning of the mixed resin for reuse in the system. These represent 2 different waste streams that are proposed to be handled completely differently. The semi-solid waste from the solids handling and the microfilter can be sent to a system for isolation, either filter press, centrifuge or other similar solids handling devices. This solid should be acceptable as solid waste to a landfill, barring any unforeseen concentrations of heavy metals (especially metals, such as Pb, Hg, Ag, Cr, As, etc.).

It is possible with some clean up, the salt could, potentially, be reused as a softening salt for industrial applications due to the extremely high concentrations of salts (primarily as NaCl) present, mainly sodium (Na) cations (92.7% of all cations) and chloride (Cl) anions (99.89% of all anions). The liquid fraction of the solids handling is returned to the front end of the system for retreatment, but because it is already treated, the dilution will lower the influent concentration. Under normal operating conditions, approximately 10% of the total volume is backwash from the microfilters, which would mean for a 400 gpm system, approximately 34 gpm would be added back as liquid and approximately 6 gallons would be as solids with waters of hydration. This leaves approximately 1.5% of the total liquid as going with the solids and being wasted.

The second phase is the resin stripping for the mixed bed ion exchange resins. This requires a high and low pH stripping of the mixed bed and leaves the liquid fraction with extremely high levels of the salts and acids (such as sodium hydroxide (NaOH) and hydrogen chloride (HCl)). These solutions are not treatable by normal techniques, but would lend themselves upon further mixing to fractional distillation technology, whereby the water is recovered and the salts remain in relatively low waters of hydration. Indeed, for every 50 gallons of concentrated effluent from the stripping process, approximately 25 gallons would be recovered and sent back to the front end of the treatment system as further dilution for the system (>98% removal of the salts from the blended streams (high and low pH)). This would yield two "dry products" as the final entities from the reaction sequences.

Given the foregoing as the rough mass balance of the system, this would mean for every 400 gallons of mixed influent (assuming the 25% flow back and 75% bad or highly contaminated retained waste water), would yield about 369 gallons per minute of reusable water for wells and about 31 gallons per minute of semi-solid wastes, or about a 92.25% recovery of all water.

Of course, an alternative route also holds true, the same technique would hold true if reverse osmosis would be employed versus the deionization route. There would be a new series of impediments to be overcome from the deionization system, which is more forgiving in ion removal and less hampered by the extent of the contamination.

This method and approach is a less costly method of the treatment and reclaim (reuse or recycle) of the contaminated water from frac'ed wells.

While specific embodiments and examples of the present invention have been illustrated and described, numerous modifications come to mind without significantly departing from the spirit of the invention, and the scope of protection is not in any way limited by any of the aforementioned examples or embodiments. Instead, the scope of the protection is only limited by the scope of the accompanying claims.

The invention claimed is:

1. A method for treating flow back water or frac'ed well water resulting from hydraulic fracturing of a gas well, the method comprising:
adding an inorganic coagulant and a polymer to untreated flow back water or frac'ed well water comprising total dissolved solids (TDS) of at least about 19,700 mg/L, wherein the inorganic coagulant and polymer are selected to increase a size of contaminants and particulates in the flow back water or frac'ed well water and to form non-tacky and non-deforming flocculent particles having a diameter in the range from about 20 microns to about 150 microns;
ensuring that the inorganic coagulant has an initial concentration in the flow back water or frac'ed well water between about 100 mg/L and about 425 mg/L;
ensuring that the polymer has an initial concentration in the flow back water or frac'ed well water between about 5 mg/L and about 200 mg/L;
using a microfilter membrane to remove the flocculent particles from the flow back water or frac'ed well water, wherein the flow back water or frac'ed well water is passed through the microfilter membrane at a back pressure less than about 20 psi, and wherein the flow back water or frac'ed well water is treated at a rate of at least 750 gallons per square foot of microfilter membrane, per day; and
periodically backwashing the microfilter membrane to remove collected flocculent particles.

2. The method of claim 1, wherein the microfilter membrane comprises a pore size between about 1 micron and about 12 microns.

3. The method of claim 1, wherein the inorganic coagulant is selected from aluminum chlorohydrate, polyaluminum chloride, aluminum sulfate, ferric sulfate, ferric chloride, dithiocarbamate, and dithiocarbonic acid.

4. The method of claim 1, wherein the polymer is selected from a condensation product of epichlorohydrin and dimethyl amine, a diallyldimethylammonium chloride ("DADMAC") polymer, and an acrylamide polymer.

5. The method of claim 1, further comprising separating oil from the flow back water or frac'ed well water.

6. The method of claim 1, wherein the initial concentrations of the inorganic coagulant and the polymer are selected to provide a ratio of inorganic coagulant to polymer in the flow back water or frac'ed well water between about 6:1 and 10:1.

7. The method of claim 2, wherein the microfilter membrane comprises a membrane material selected from polypropylene, a polysulfone, polyethylene, and polytetrafluoroethylene.

8. A method for treating flow back water or frac'ed well water resulting from hydraulic fracturing of a gas well, the method consisting of:
providing untreated flow back water or frac'ed well water, the flow back water or frac'ed well water comprising total dissolved solids (TDS) of at least about 19,700 mg/L;
removing oil from the flow back water or frac'ed well water;
ensuring that the pH of the flow back water or frac'ed well water is between about 7.2 and about 7.7;
adding an inorganic coagulant and a polymer to the flow back water or frac'ed well water selected to increase a size of contaminants and particulates in the flow back water or frac'ed well water and to form non-tacky and non-deforming flocculent particles having a diameter in the range from about 30 microns to about 100 microns, wherein a ratio of inorganic coagulant to polymer in the flow back water or frac'ed well water is between about 6 to 1 and about 10 to 1; and
using a microfilter to remove the flocculent particles from the flow back water or frac'ed well water, wherein the microfilter comprises a pore size between about 1 and about 12 microns, and wherein the flow back water or frac'ed well water is treated at a rate of at least 750 gallons per square foot of microfilter membrane, per day; and
periodically backwashing the microfilter membrane to remove collected flocculent particles.

9. A method for treating flow back water or frac'ed well water resulting from hydraulic fracturing of a gas well, the method comprising:
adding aluminum chlorohydrate and a condensation product of epichlorohydrin and dimethyl amine (epi/dma) to untreated flow back water or frac'ed well water comprising total dissolved solids (TDS) of at least about 19,700 mg/L, wherein the aluminum chlorohydrate has an initial concentration in the flow back water or frac'ed well water between about 25 ppm to about 250 ppm and a ratio of aluminum chlorohydrate and epi/dma in the flow back water or frac'ed well water between about 6 to 1 and about 10 to 1 selected to increase a size of contaminants and particulates in the flow back water or frac'ed well water and to form non-tacky and non-deforming flocculent particles having a diameter in the range from about 30 microns to about 100 microns;
using a microfilter membrane to remove the flocculent particles from the flow back water or frac'ed well water, wherein the microfilter membrane comprises a pore size between about 1 and about 12 microns, and wherein the flow back water or frac'ed well water is treated at a rate of at least 750 gallons per square foot of microfilter membrane, per day; and
periodically backwashing the microfilter membrane to remove collected flocculent particles.

10. The method of claim 1, wherein the microfiltered water is further processed by a water cleaning technique selected from carbon filtration, ion exchange media, reverse osmosis, deionization, mixed bed deionizer, electro-separation, fractional distillation, and distillation.

11. The method of claim 1, wherein the flow back water or frac'ed well water is passed through the microfilter membrane at a back pressure less than about 15 psi.

12. The method of claim 8, wherein the inorganic coagulant is selected from aluminum chlorohydrate, polyaluminum chloride, aluminum sulfate, ferric sulfate, ferric chloride, dithiocarbamate, and dithiocarbonic acid.

13. The method of claim 8, wherein the polymer is selected from a condensation product of epichlorohydrin and dimethyl amine, a diallyldimethylammonium chloride ("DADMAC") polymer, and an acrylamide polymer.

14. The method of claim 8, further comprising:
ensuring that the inorganic coagulant has an initial concentration in the flow back water or frac'ed well water between about 100 mg/L and about 425 mg/L.

15. The method of claim 8, further comprising:
ensuring that the polymer has an initial concentration in the flow back water or frac'ed well water between about 5 mg/L and about 200 mg/L.

* * * * *